(12) United States Patent
Chavez et al.

(10) Patent No.: US 9,424,110 B2
(45) Date of Patent: *Aug. 23, 2016

(54) PROVIDING A RECOVERY PLACEHOLDER WITHIN AN APPLICATION

(71) Applicant: International Business Machines Corporation, Armonk, NY (US)

(72) Inventors: Lisa M. Chavez, Tucson, AZ (US); Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,188

(22) Filed: Mar. 31, 2016

(65) Prior Publication Data

US 2016/0210207 A1 Jul. 21, 2016

Related U.S. Application Data (63) Continuation of application No. 14/202,514, filed on Mar. 10, 2014.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |
| *G06F 11/14* | (2006.01) |

(52) U.S. Cl.
CPC ............ *G06F 9/542* (2013.01); *G06F 11/1438* (2013.01); *G06F 11/1469* (2013.01)

(58) Field of Classification Search
None
See application file for complete search history.

(56) References Cited

U.S. PATENT DOCUMENTS

| | | |
|---|---|---|
| 5,862,381 A | 1/1999 | Advani et al. |
| 6,751,777 B2 | 6/2004 | Bates et al. |

(Continued)

OTHER PUBLICATIONS

Microsoft, "Add or delete bookmarks", http://office.microsoft.com/en-us/word-help/add-or-delete-bookmarks-HP001226532.aspx, 2014, Microsoft Corporation, 2 pages.
TheForger's Win32 API Programming Tutorial, "Understanding the Message Loop", http://www.winprog.org/tutorial/message_loop.html, 2013, Brook Miles (tut...©winprog.org), 3 pages.

(Continued)

*Primary Examiner* — Craig Dorais
(74) *Attorney, Agent, or Firm* — John R. Pivnichny; Madeline F. Schiesser; Keohane & D'Alessandro PLLC (57) ABSTRACT

Embodiments described herein provide recovery placeholders within an application. Specifically, one approach includes providing an application operating on a client device, and generating a recovery placeholder that defines a current state of the application by analyzing a queue containing a set of messages, and identifying one or more selected events corresponding to the application from the queue. In one approach, the current state defines, at the time the recovery placeholder is generated, at least one of: a position within a window of the application, a current activity of the application, a position of the window within a display of a display device, and a placement order of the window of the application in relation to a stack of other cascaded windows. At a later point in time, the application may then be restored to the current state by accessing the recovery placeholder to replay the one or more selected events.

20 Claims, 4 Drawing Sheets

(56) References Cited

U.S. PATENT DOCUMENTS

| | | |
|---|---|---|
| 7,441,512 B2 | 10/2008 | Swallow et al. |
| 8,107,971 B1 | 1/2012 | Roberts et al. |
| 2003/0188263 A1 | 10/2003 | Bates et al. |
| 2005/0071666 A1 | 3/2005 | Chu et al. |
| 2005/0097549 A1 | 5/2005 | Chu et al. |
| 2013/0091457 A1 | 4/2013 | Ferri et al. |
| 2015/0254114 A1 | 9/2015 | Chavez et al. |

OTHER PUBLICATIONS

Dorais, U.S. Appl. No. 14/202,514, Office Action dated Feb. 26, 2015, 14 pages.

Dorais, U.S. Appl. No. 14/202,514, Final Office Action dated Jun. 10, 2015, 15 pages.

Dorais, U.S. Appl. No. 14/202,514, Office Action dated Nov. 16, 2015, 21 pages.

Dorais, U.S. Appl. No. 14/202,514, Notice of Allowance dated Mar. 2, 2016, 9 pages.

PROVIDING A RECOVERY PLACEHOLDER WITHIN AN APPLICATION

The present patent document is a continuation of U.S. patent application Ser. No. 14/202,514, Mar. 10, 2014, entitled "PROVIDING A RECOVERY PLACEHOLDER WITHIN AN APPLICATION", the disclosure of which is incorporated herein by reference.

BACKGROUND

1. Field of the Invention

This invention relates generally to graphical interface and application state recovery and, more specifically, to providing a recovery placeholder within an application to facilitate application state recovery.

2. Description of the Related Art

When working in multiple applications and tools throughout the day, users often jump from application to application, sometimes mid-thought or mid-activity. It is common that users find themselves stopping in the middle of reading a web page, document, spreadsheet, etc. However, moving on to another topic or application that has taken away the user's attention, and then attempting to return to the previous application looking for where the user has left off, is inefficient and leads to a decreased user experience.

The use of a bookmark to mark where the user was previously reading is known in the art. In one approach, a bookmarking device has a marking membrane on a panel member for marking the appropriate indicia relating to the position on the page of the literature where the reader previously left off. Another type of prior art bookmark clenches a sheaf of pages to indicate to the reader where he/she was previously reading. Yet another prior art approach provides a clasp placed on a sheet of a printed document for calling out a specific line of text within the printed document.

Many browsers also support the use of bookmarks (also referred to as aliases, shortcuts or favorites), through which a user can maintain a list of favorite sites or documents that a user expects to revisit in the future. Retrieving a bookmarked document at a later date then only requires the user to locate the bookmark corresponding to a desired document in the list, and then select that bookmark to initiate retrieval of the document.

However, what is needed is a recovery approach that goes beyond web page bookmarking and/or line indication in a static document.

SUMMARY

In general, embodiments described herein provide approaches for generating a recovery placeholder within an application. Specifically, at least one approach includes providing an application operating on a client device, and generating a recovery placeholder that defines a current state of the application by analyzing a queue containing a set of messages, and identifying one or more selected events corresponding to the application from the queue. In one approach, the current state defines, at the time the recovery placeholder is generated, at least one of: a position within a window of the application, a current activity of the application, a position of the window within a display of a display device, and a placement order of the window of the application in relation to a stack of other cascaded windows. At a later point in time, the application may then be restored to the current state by accessing the recovery placeholder to replay the one or more selected events. The position of the recovery placeholder will be persistent, and maintains its location if the application window is moved, minimized, maximized, etc.

One aspect of the present invention includes a method for providing a recovery placeholder within an application, the method comprising computer-implemented steps of: providing an application operating on a client computing device; generating, in response to a user initiating a navigation away from the application, a recovery placeholder that defines a current state of the application by: analyzing a queue containing a set of messages, the set of messages associated with a set of actions of the user within the application; selecting from the queue one or more events corresponding to the application; associating each of the selected events with a windows handle of the application, the selected events comprising a set of timestamps and a sequential series of previous actions corresponding to a configuration of a user interface of the applications in a display of the client computing device; and storing a display configuration sequence comprising the one or more selected events based on the windows handle associated with each event, the configuration sequence being configured to replay the selected events without altering a content entered by the user of the application; and replaying the events associated with at least one windows handle to return the application to a state defined by the recovery placeholder, wherein the placeholder comprises a marker in the display of the client computing device, the marker having a set of coordinates that designate a focus of the user prior to the navigation away from the application.

Another aspect of the present invention provides a computer system for providing a recovery placeholder within an application, the computer system comprising: a memory medium comprising program instructions; a bus coupled to the memory medium; and a processor, for executing the program instructions, coupled to a recovery placeholder generator via the bus that when executing the program instructions causes the system to: provide an application operating on a client computing device; generate, in response to a user initiating a navigation away from the application, a recovery placeholder that defines a current state of the application by: analyzing a queue containing a set of messages, the set of messages associated with a set of actions of the user within the application; selecting from the queue one or more events corresponding to the application; associating each of the selected events with a windows handle of the application, the selected events comprising a set of timestamps and a sequential series of previous actions corresponding to a configuration of a user interface of the applications in a display of the client computing device; and storing a display configuration sequence comprising the one or more selected events based on the windows handle associated with each event, the configuration sequence being configured to replay the selected events without altering a content entered by the user of the application; and replay the events associated with at least one windows handle to return the application to a state defined by the recovery placeholder, wherein the placeholder comprises a marker in the display of the client computing device, the marker having a set of coordinates that designate a focus of the user prior to the navigation away from the application.

Yet another aspect of the present invention provides a computer program product for providing a recovery placeholder within an application, the computer program product comprising a computer readable hardware storage device, and program instructions stored on the computer readable hardware storage device, to: provide an application operating on a client computing device; generate, in response to a user initiating a navigation away from the application, a recovery placeholder that defines a current state of the application by:

analyzing a queue containing a set of messages, the set of messages associated with a set of actions of the user within the application; selecting from the queue one or more events corresponding to the application; associating each of the selected events with a windows handle of the application, the selected events comprising a set of timestamps and a sequential series of previous actions corresponding to a configuration of a user interface of the applications in a display of the client computing device; and storing a display configuration sequence comprising the one or more selected events based on the windows handle associated with each event, the configuration sequence being configured to replay the selected events without altering a content entered by the user of the application; and replay the events associated with at least one windows handle to return the application to a state defined by the recovery placeholder, wherein the placeholder comprises a marker in the display of the client computing device, the marker having a set of coordinates that designate a focus of the user prior to the navigation away from the application.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments now will be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining," "evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide approaches for generating a recovery placeholder within an application. Specifically, at least one approach includes providing an application operating on a client device, and generating a recovery placeholder that defines a current state of the application by analyzing a queue containing a set of messages, and identifying one or more selected events corresponding to the application from the queue. In one approach, the current state defines, at the time the recovery placeholder is generated, at least one of: a position within a window of the application, a current activity of the application, a position of the window within a display of a display device, and a placement order of the window of the application in relation to a stack of other cascaded windows. At a later point in time, the application may then be restored to the current state by accessing the recovery placeholder to replay the one or more selected events. The position of the recovery placeholder will be persistent, and maintains its location if the application window is moved, minimized, maximized, etc.

Figure 1:
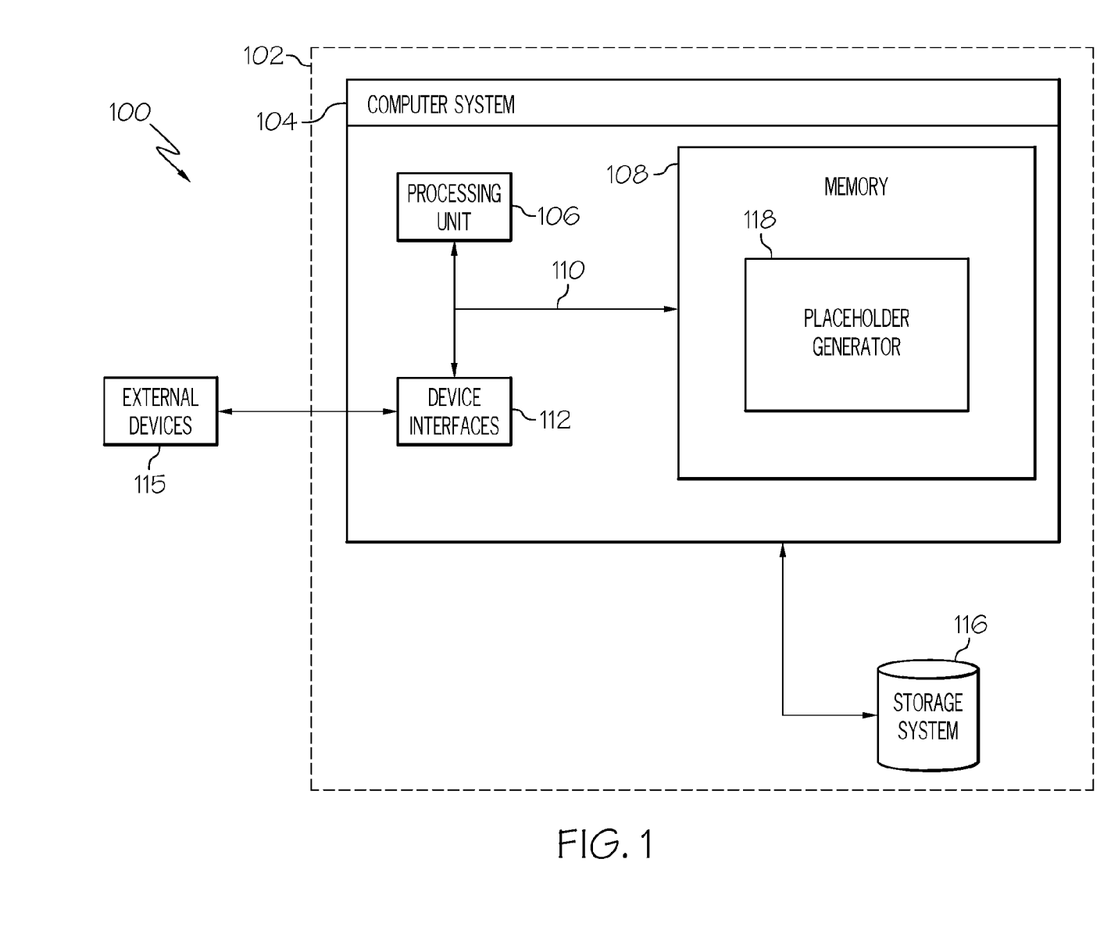
FIG. 1 shows an architecture in which the invention may be implemented according to illustrative embodiments.

Referring now to FIG. 1, a computerized implementation 100 of an exemplary embodiment will be shown and described. As depicted, implementation 100 includes computer system 104 deployed within a computer infrastructure 102 (e.g., a client device). This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing a recovery placeholder within an application. It should be understood that any other computers implemented under the present invention may have different components/software, but will perform similar functions. As shown, computer system 104 includes a processing unit 106 capable of communicating with an placeholder generator 118 stored in memory 108, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115 and placeholder generator 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating placeholder generator 118, which is stored in memory 108 and/or storage system 116. While executing computer program code, processing unit 106 can read and/or write data to/from memory 108, storage system 116, and placeholder generator 118. Storage system 116 can include VCRs, DVRs, RAID arrays, USB hard drives, optical disk recorders, flash storage devices, and/or any other data processing and storage elements for storing and/or processing data.

Figure 2:
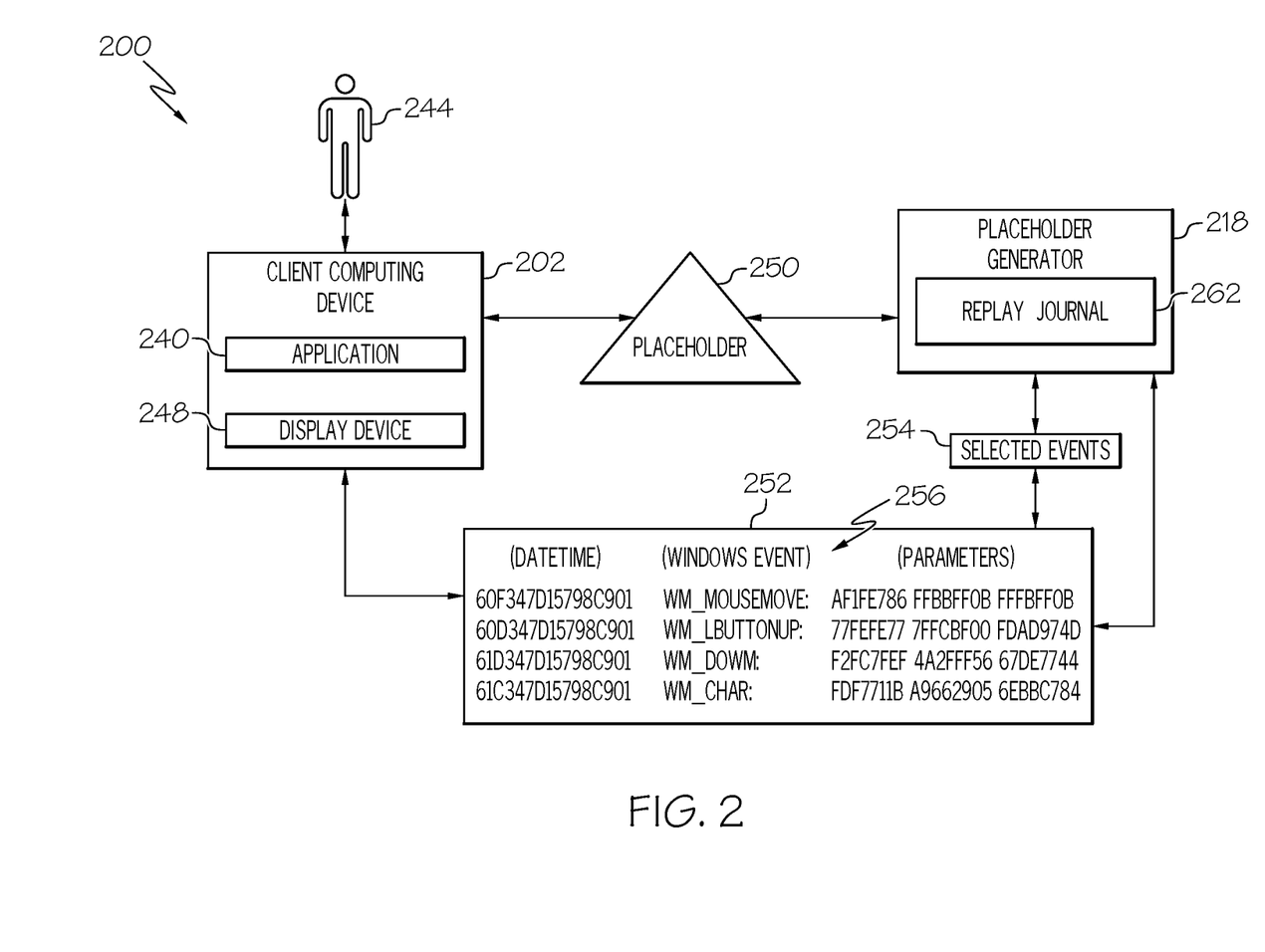
FIG. 2 shows a pictorial representation of an implementation of providing a recovery placeholder within an application according to illustrative embodiments.

Referring now to FIG. 2, the structure and operation of a system 200 for providing a recovery placeholder within an application according to exemplary embodiments will be described in greater detail. As illustrated, system 200 comprises one or more client applications 240 (e.g., a web browser, social media application, email application, etc.) operating with client computing device 202 (e.g., a smart phone, tablet computer, cellular/mobile phone, a desktop computer and monitor, etc.). During operation, a user 244 can, using mouse gestures and/or keyboard strokes, summon a recovery placeholder 250 (e.g., a "pin" or "marker"), which acts as a pointer to record and indicate to user 244 and/or move a cursor and input focus to the position in space and time within the context of application 240 that was being used (i.e., a pointer in time and space to where user 244 left off, and to where user 244 would presumably like to resume when returning to application 240).

In an exemplary embodiment, placeholder generator 218 is configured to produce recovery placeholder 250, which defines the current state of application 240 by analyzing a queue 252 containing a set of messages 256, and identifying one or more selected events 254 corresponding to application 240 from queue 252. As will be shown and described in further detail herein, the current state of application 240 comprises one or more of: a position within a window of application 240 (e.g., as measured using an x-y coordinate from a corner of the displayed window of application 240), a current activity of the application, a position of the window within a display 248 of a display device (e.g., part of client computing device 202), and/or a placement order of the window of application 240 in relation to a stack of other cascaded windows.

In one embodiment queue 252 is a windows operation queue, and contains a set of compiled messages 256, each corresponding to an activity/event occurring within application 240 (or an activity/event across other applications operating on client computing device 202). In this non-limiting embodiment, each message from set of messages 256 is an integer value. Messages are used to communicate virtually everything occurring in the operating system (e.g., Microsoft Windows) that is controlling client computer device 202 and application 240. (Windows and Microsoft are trademarks of Microsoft Corporation in the United States, other countries, or both.) For example, if a window or control (which is just a specialized window) to do something is desired, a message is created and added to queue 252. Or, if an event happens such as user 244 typing on the keyboard, moving the mouse, clicking a button, etc., then messages are sent by the system to the windows affected. Each message 256 is compiled chronologically and, as such, may be provided with a date/time stamp.

During operation, placeholder generator 218 parses set of messages 256 in queue 252 to identify the current state of application 240 based on one or more of selected events 254. That is, a tracking function of placeholder generator 218 monitors queue 252, and uses that information as a time line to mark application focus, cursor position, window position, etc. It will be appreciated that queue 252 is preferably parsed in such a way as to avoid altering users' input. The placement logic reviews all queue messages 256 and places, in a replay journal/list 262, only those events that do not alter the content of application 240, i.e., just selected events 254 used for placement of recovery placeholder 250.

In one embodiment, a daemon or a system program is invoked to "hook" windows queue 252 and record information for use in placing recovery placeholder 250. Each marker is placed in application 240 by the unique window handle of application 240. As such, when user 244 calls to place recovery placeholder 250 in application 240 at a point in space and time, the windows handle can be identified and queue 252 reviewed to figure out how to replay, logically, the steps necessary for placing recovery placeholder 250. In one approach, a journaling hook is placed in application 240, and the appropriate messages are played to place the marker in the position needed.

Figure 3:
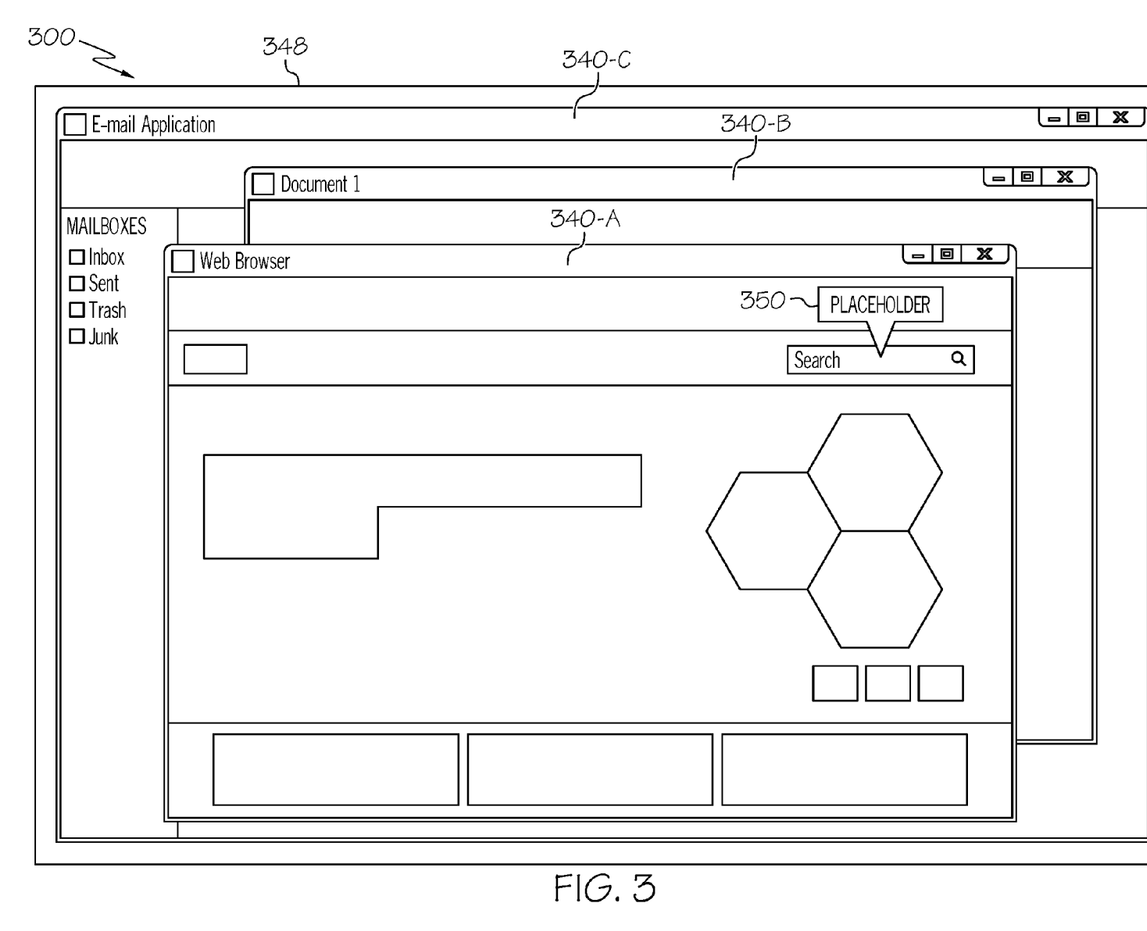
FIG. 3 shows a display device output including a recovery placeholder according to illustrative embodiments.

Turning now to FIG. 3, an exemplary output 300 from display device 348 will be described in greater detail. As shown, output 300 represents a user display having a number of applications currently in use/open. In this non-limiting example, application 340-A is a web browser, application 340-B is a word processor document, and application 340-C is an email application. Applications 340A-C are depicted as a set of 3-dimensional cascading (e.g., overlaid) windows, wherein application 340-A appears on top, or closest to the user in a Z-order, application 340-B is positioned in the middle, and application 340-C is positioned on the bottom. During use, it is common that the relative order, position, and/or an overall number of applications may change as the user traverses from application to application, as well as to and from different activities and areas within each of applications 340A-C. To assist the user experience, recovery placeholder 350 can be generated and displayed within one or more applications, as shown in FIG. 3, to define its current state at that moment in time. In this embodiment, recovery placeholder 350 is depicted as a call-out graphic superimposed over a search input section of the webpage that is application 340-A. In another embodiment, recovery placeholder may be have a different style, e.g., an "X", a colored line, a custom graphic, etc., and may also include notes or text (e.g., the users last thought before leaving application 340-A).

In another embodiment, recovery placeholder 350 may also comprise an alert that indicates to the user when it's time to come back to the application after a given amount of time. The alert can comprise any number of configurable features, including a flashing taskbar, bringing an application to the top of the window stack, a SMS text sent to the user, an email message sent to the user, etc.

Regardless of the specific alert appearance and or message, recovery placeholder 350 functions to subsequently restore applications 340A-C to the state they were at the moment in time in which recovery placeholder 350 was generated and placed within application 340 by accessing recovery placeholder 350 to replay the one or more selected events. In various embodiments, restoring applications 340A-C to the current state comprises at least one of the following: returning a cursor to its position within the application (e.g., application 340-A) at a time recovery placeholder 350 was generated, returning the window to its position within display 348 at the time recovery placeholder 350 was generated, and/or returning the window to its placement order in relation to the stack of other cascaded windows of applications 340A-N at the time recovery placeholder 350 was generated. In other words, output 300 of display 348, which has since changed following an initial setting of recovery placeholder 350, is returned to its exact appearance and operational state, including widow position(s), relative widow order, cursor position, etc., at the time it existed when placeholder 350 was set.

In one embodiment, to provide positional tracking, recovery placeholder 350 defines a set of XYZ coordinates, e.g., from the top/left of the application window position. The position in space-time will preferably be persistent and maintain it's dropped location even if the application window is moved, minimized, maximized, etc. Furthermore, the position in space-time is application agnostic (i.e., not tied to any single application). Positioning is not dependent upon an inner knowledge of the application that it's marking. Instead, it the window handle is used to detect the target application. In one embodiment, the mouse coordinates in the context of the window handle will be used to drop recovery placeholder 350.

In another embodiment, if an application has been pinned with recovery placeholder 350, it will not allow navigation away from, e.g., a web page, or the closure of the application without prompting to save the recovery placeholder location and document. A prompt may also be provided when the user is moving away from a pinned page, along with a request for verification from the user that the move away from the web page is truly intended.

It can be appreciated that the approaches disclosed herein can be used within a computer system to integrate and allow searching of a plurality of electronic communications received from multiple communication platforms. In this case, as shown in FIGS. 1-2, the recovery placeholder generator can be provided, and one or more systems for performing the processes described in the invention can be obtained and deployed to computer infrastructure 102 (FIG. 1). To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 4:
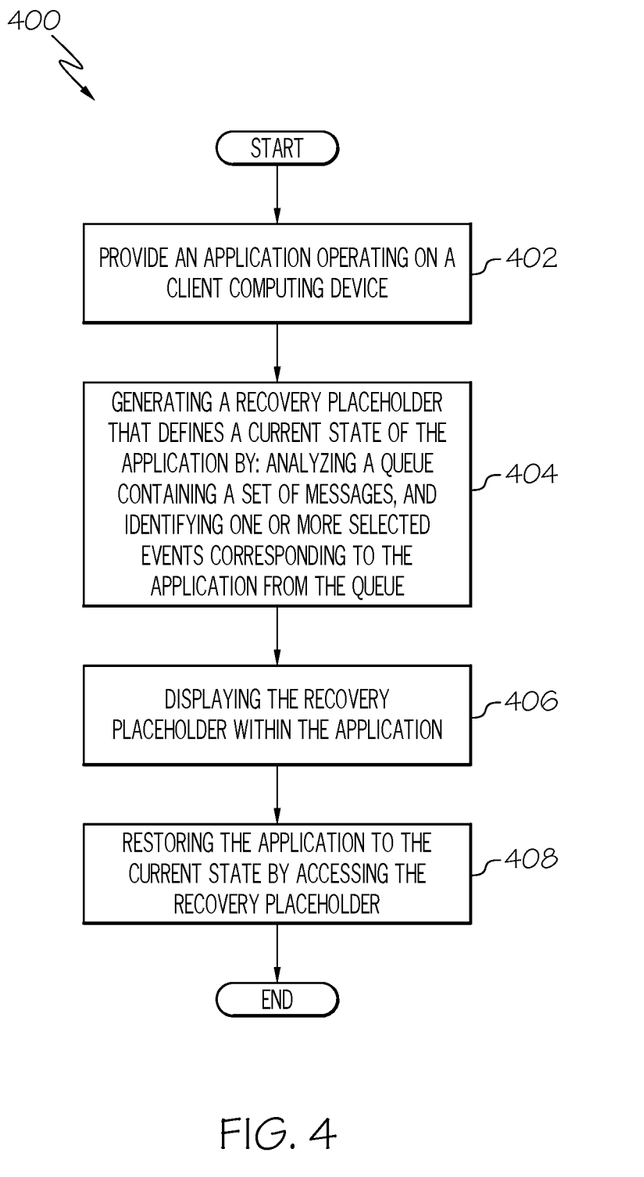
FIG. 4 shows a process flow for providing a recovery placeholder within a client application according to illustrative embodiments.

As depicted in FIG. 4, a system (e.g., computer system 104) carries out the methodologies disclosed herein. Shown is a process flow 400 for providing a recovery placeholder within an application. At 402, an application operating on a client computing device is provided. At 404, a placeholder is generated within the application, the placeholder defining the current state of the application by analyzing a queue containing a set of messages related to the application. At 406, the placeholder is displayed within the application. At 408, the application is restored to the current state by accessing the placeholder.

Process flow 400 of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, placeholder generator 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for providing a recovery placeholder within an application. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for providing a recovery placeholder within an application, the method comprising computer-implemented steps of:
   providing the application operating on a client computing device;
   generating, in response to a user initiating a navigation away from the application, the recovery placeholder that defines a current state of the application by:
   analyzing a queue containing a set of messages, the set of messages associated with a set of actions of the user within the application;
   selecting from the queue one or more events corresponding to the application;
   associating each of the selected events with a windows handle of the application, the selected events comprising a set of timestamps and a sequential series of previous actions corresponding to a configuration of a user interface of the applications in a display of the client computing device; and
   storing a display configuration sequence comprising the one or more selected events based on the windows handle associated with each event, the configuration sequence being configured to replay the selected events without altering a content entered by a user of the application; and
   replaying the events associated with at least one windows handle to return the application to a state defined by the recovery placeholder,
   wherein the placeholder comprises a marker in the display of the client computing device, the marker having a set of coordinates that designate a focus of the user prior to the navigation away from the application.

2. The method of claim 1, further comprising:
   compiling the set of messages in the queue, the set of messages corresponding to all activity occurring within the application; and
   parsing the set of messages in the queue to identify the current state of the application based on the one or more selected events.

3. The method of claim 2, the current state comprising a position within a window of the application and a current activity of the application.

4. The method according to claim 3, the current state further comprising a position of the window within a display of a display device, and a placement order of the window of the application in relation to a stack of other cascaded windows.

5. The method of claim 1, further comprising displaying the recovery placeholder within the application, wherein the recovery placeholder comprises text entered by the user prior to the user navigating away from the application.

6. The method of claim 1, further comprising restoring the application to the current state by accessing the recovery placeholder to replay the one or more selected events.

7. The method of claim 6, the restoring the application to the current state comprising at least one of the following: returning a cursor to its position within the application at a time the recovery placeholder was generated, returning the window to its position within a display of a display device at the time the recovery placeholder was generated, and returning the window to its placement order in relation to a stack of other cascaded windows at the time the recovery placeholder was generated.

8. A computer system for providing a recovery placeholder within an application, the computer system comprising:
   a memory medium comprising program instructions;
   a bus coupled to the memory medium; and
   a processor, for executing the program instructions, coupled to the recovery placeholder generator via the bus that when executing the program instructions causes the system to:
   provide the application operating on a client computing device;
   generate, in response to a user initiating a navigation away from the application, the recovery placeholder that defines a current state of the application by:
   analyzing a queue containing a set of messages, the set of messages associated with a set of actions of the user within the application;
   selecting from the queue one or more events corresponding to the application;
   associating each of the selected events with a windows handle of the application, the selected events comprising a set of timestamps and a sequential series of previous actions corresponding to a configuration of a user interface of the applications in a display of the client computing device; and
   storing a display configuration sequence comprising the one or more selected events based on the windows handle associated with each event, the configuration sequence being configured to replay the selected events without altering a content entered by a user of the application; and
   replay the events associated with at least one windows handle to return the application to a state defined by the recovery placeholder,
   wherein the placeholder comprises a marker in the display of the client computing device, the marker having a set of coordinates that designate a focus of the user prior to the navigation away from the application.

9. The computer system of claim 8, further comprising program instructions to:
   compile the set of messages in the queue, the set of messages corresponding to all activity occurring within the application; and
   parse the set of messages in the queue to identify the current state of the application based on the one or more selected events.

10. The computer system of claim 9, the current state comprising a position within a window of the application and a current activity of the application.

11. The computer system of claim 10, the current state further comprising a position of the window within a display of a display device, and a placement order of the window of the application in relation to a stack of other cascaded windows.

12. The computer system of claim 10, further comprising program instructions to display the recovery placeholder within the application, wherein the recovery placeholder comprises text entered by the user prior to the user navigating away from the application.

13. The computer system of claim 8, further comprising program instructions to restore the application to the current state by accessing the recovery placeholder to replay the one or more selected events.

14. The computer system of claim 13, the program instructions to restore the application to the current state comprising program instructions to perform at least one of the following: return a cursor to its position within the application at a time the recovery placeholder was generated, return the window to its position within a display of a display device at the time the recovery placeholder was generated, and return the window to its placement order in relation to a stack of other cascaded windows at the time the recovery placeholder was generated.

15. A computer program product for providing a recovery placeholder within an application, the computer program product comprising a computer readable hardware storage device, and program instructions stored on the computer readable hardware storage device, to:
provide the application operating on a client computing device;
generate, in response to a user initiating a navigation away from the application, the recovery placeholder that defines a current state of the application by:
analyzing a queue containing a set of messages, the set of messages associated with a set of actions of the user within the application;
selecting from the queue one or more events corresponding to the application;
associating each of the selected events with a windows handle of the application, the selected events comprising a set of timestamps and a sequential series of previous actions corresponding to a configuration of a user interface of the applications in a display of the client computing device; and
storing a display configuration sequence comprising the one or more selected events based on the windows handle associated with each event, the configuration sequence being configured to replay the selected events without altering a content entered by a user of the application; and
replay the events associated with at least one windows handle to return the application to a state defined by the recovery placeholder,
wherein the placeholder comprises a marker in the display of the client computing device, the marker having a set of coordinates that designate a focus of the user prior to the navigation away from the application.

16. The computer program product of claim 15, the computer readable hardware storage device further comprising program instructions to:
compile the set of messages in the queue, the set of messages corresponding to all activity occurring within the application; and
parse the set of messages in the queue to identify the current state of the application based on the one or more selected events.

17. The computer program product of claim 16, the current state comprising a position within a window of the application and a current activity of the application.

18. The computer program product of claim 17, the current state further comprising a position of the window within a display of a display device, and a placement order of the window of the application in relation to a stack of other cascaded windows.

19. The computer program product of claim 17, the computer readable hardware storage device further comprising program instructions to display the recovery placeholder within the application, wherein the recovery placeholder comprises text entered by the user prior to the user navigating away from the application.

20. The computer program product of claim 15, the computer readable hardware storage device further comprising program instructions to restore the application to the current state by accessing the recovery placeholder to replay the one or more selected events.

* * * * *